United States Patent
Gora et al.

(10) Patent No.: US 9,740,837 B2
(45) Date of Patent: Aug. 22, 2017

(54) APPARATUS AND METHOD FOR PREVENTING CLONING OF CODE

(71) Applicant: Infineon Technologies AG, Neubiberg (DE)

(72) Inventors: Witold Gora, Unterhaching (DE); Andreas Geiler, Munich (DE); Gerd Dirscherl, Munich (DE); Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/453,116

(22) Filed: Aug. 6, 2014

(65) Prior Publication Data

US 2016/0042160 A1    Feb. 11, 2016

(51) Int. Cl.
*G06F 21/00* (2013.01)
*G06F 21/12* (2013.01)
*G06F 21/14* (2013.01)
*G06F 21/60* (2013.01)

(52) U.S. Cl.
CPC .............. *G06F 21/12* (2013.01); *G06F 21/14* (2013.01); *G06F 21/602* (2013.01); *G06F 2221/0744* (2013.01)

(58) Field of Classification Search
CPC ........ G06F 21/12; G06F 21/14; G06F 21/602; G06F 2221/0744
See application file for complete search history.

(56) References Cited

U.S. PATENT DOCUMENTS

| | | | | |
|---|---|---|---|---|
| 2009/0094601 A1* | 4/2009 | Vstovskiy | ............. | G06F 21/123 717/177 |
| 2009/0187769 A1* | 7/2009 | Camiel | ................. | G06F 21/123 713/189 |
| 2010/0325446 A1* | 12/2010 | Mordetsky | ............ | G06F 21/125 713/190 |
| 2015/0149732 A1* | 5/2015 | Kiperberg | ........... | G06F 12/0888 711/139 |

\* cited by examiner

*Primary Examiner* — Mahfuzur Rahman
*Assistant Examiner* — Narcisco Victoria
(74) *Attorney, Agent, or Firm* — Schiff Hardin LLP

(57) ABSTRACT

An apparatus and corresponding method for preventing cloning of code. The apparatus includes a memory, an authentication module, and a device. The memory is configured to store the code, which includes unencrypted code and a fragment of encrypted code. The authentication module is configured to receive and decrypt the fragment of encrypted code from the memory into a fragment of decrypted code, and to store the fragment of decrypted code in an authentication module buffer. The device configured to execute the unencrypted code from the memory and to execute the fragment of decrypted code from the authentication module buffer, wherein the fragment of encrypted code is personalized to the device.

16 Claims, 4 Drawing Sheets

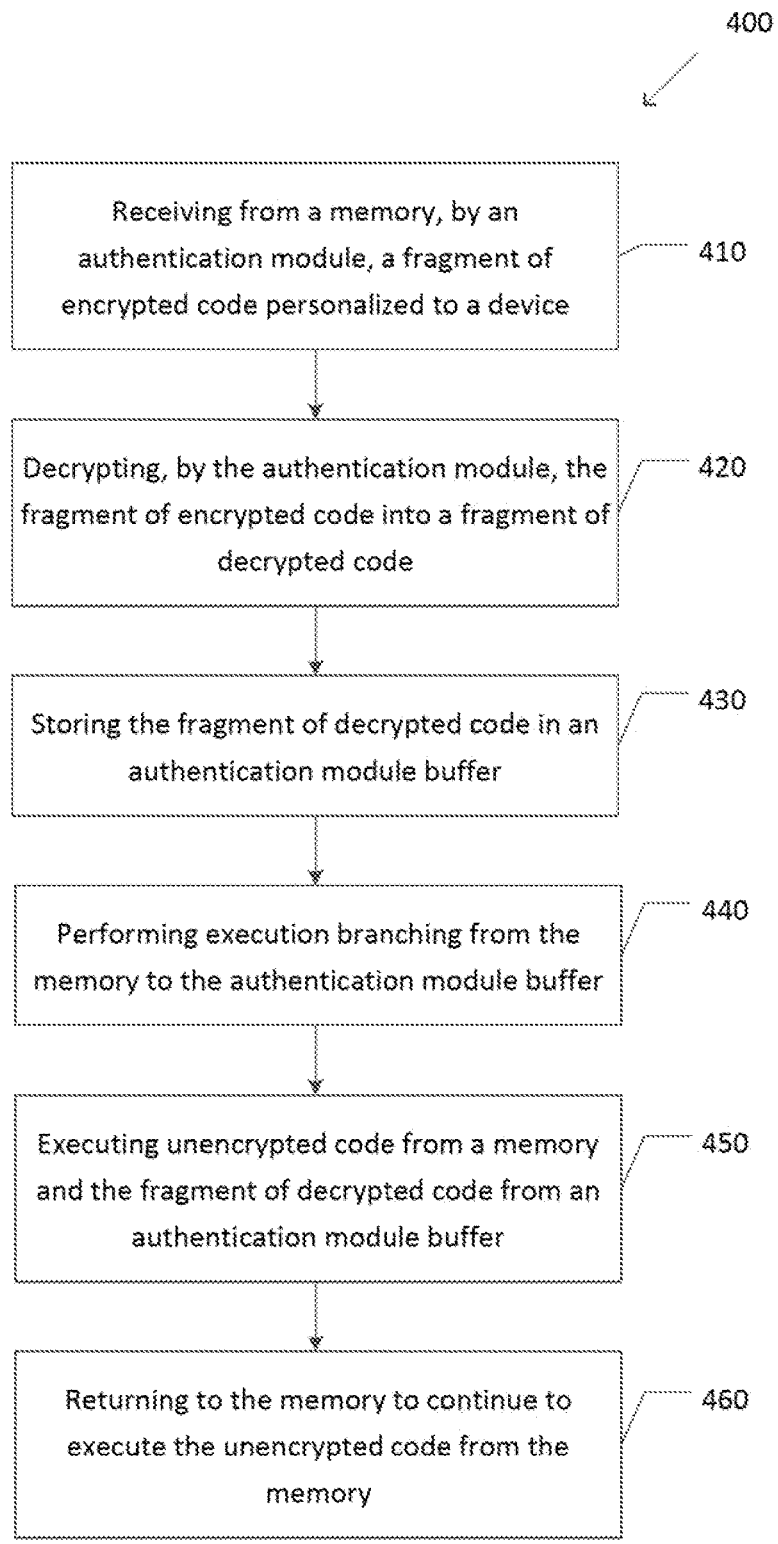

APPARATUS AND METHOD FOR PREVENTING CLONING OF CODE

BACKGROUND

The present disclosure relates to preventing cloning of code that is personalized for a device, such as a microcontroller.

BRIEF DESCRIPTION OF THE DRAWINGS

FIG. 4 is a flowchart illustrating a method for preventing cloning of code.

DETAILED DESCRIPTION

There are numerous approaches for preventing software code from being retrieved from a device. One approach is read protection of the code, that is, a mechanism that prevents unauthorized memory access. This approach is disadvantageous in that if plain code, that is, unencrypted/decrypted code, is retrieved by an attacker, the code may be reused or easily adapted for another device.

Another approach is storing encrypted code in memory and decrypting this code on-the-fly upon code fetch. This approach is disadvantageous in that decryption requires high computation performance. In practice it may be challenging or impossible to meet performance requirements of the system without hardware acceleration at the expense of significant gate count/area and power consumption.

Another approach is decrypting a large portion of code prior to execution and storing the decrypted code in an internal controller memory to be fetched. This approach, as with the first approach described above, is disadvantageous in that if an attacker retrieves the decrypted code, the code may be reused or easily adapted for another device.

The present disclosure is directed to an apparatus and method for preventing cloning of code to be used on a non-authorized device. The code is partly or entirely dependent on the original device for which it is written. Code re-engineering is prevented even if the code is obtained by an attacker because the code is not executable on the non-authorized device.

Figure 1:
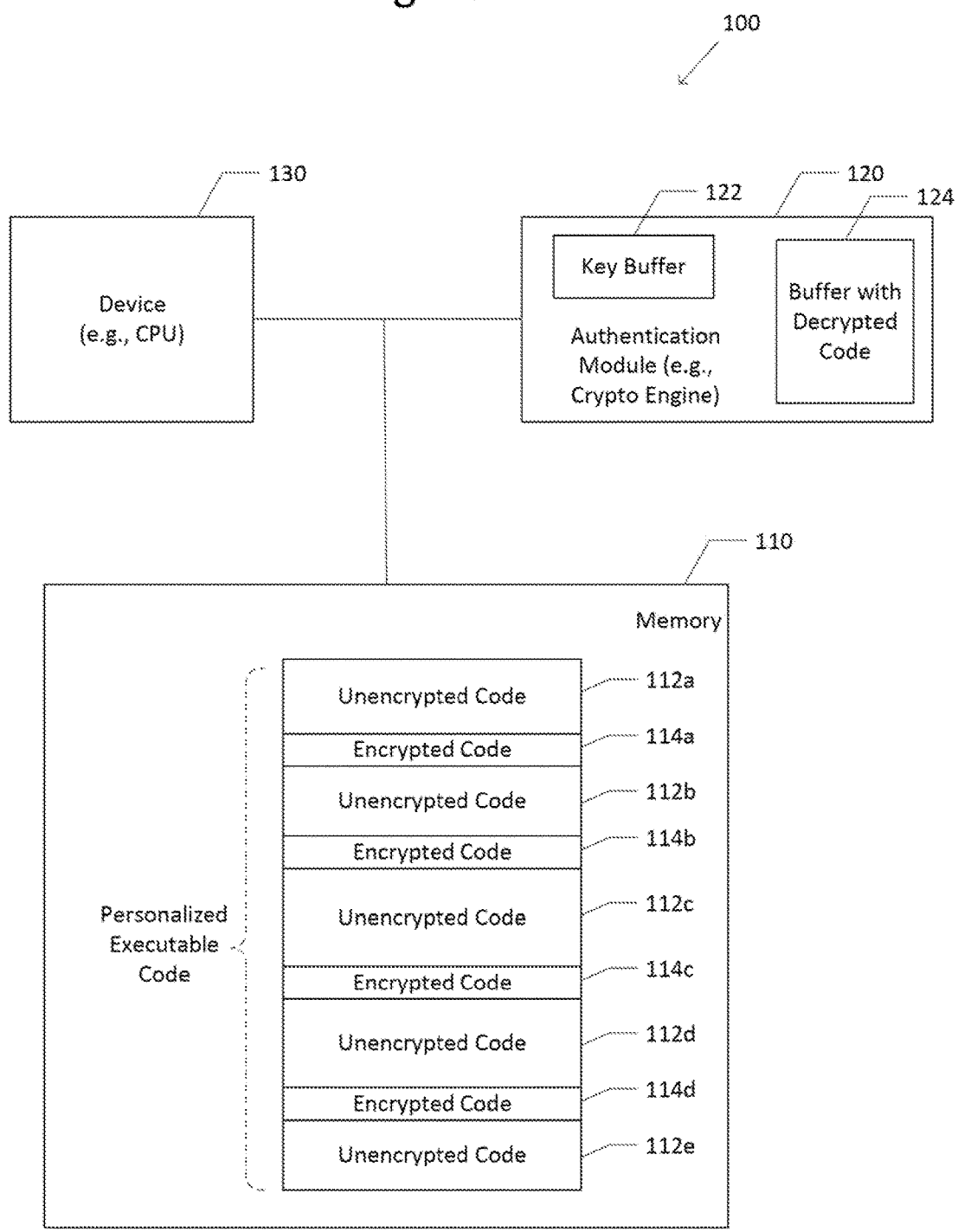
FIG. 1 is a schematic diagram illustrating an apparatus for preventing cloning of code.

FIG. 1 is a schematic diagram illustrating an apparatus (e.g., a microcontroller) 100 for preventing cloning of code. The apparatus 100 includes a memory 110, an authentication module 120, and a device 130.

The memory 110 is configured to store code, which includes unencrypted code 112a-112e and one or more fragments of encrypted code 114a-114d. The fragments of encrypted code 114a-114d personalize the code for the specific device 130. Alternatively, the fragments of encrypted code 114a-114d may personalize the code for a defined group of devices. This group of devices may be defined by, for example, lot, customer, etc.

The authentication module 120 includes a key buffer 122 and an authentication module buffer 124. The authentication module 120 is configured to receive and decrypt a fragment of encrypted code 114 from the memory 110 into a fragment of decrypted code and store the fragment of decrypted code in the authentication module buffer 124. The authentication module buffer 124 may be accessed only for data write in order to receive the fragments of decrypted data, and for read in code execute mode only. A read access from the authentication module buffer 124 is not permitted in order to ensure protection of the decrypted code from being read as plain data.

The authentication module 120 may be, for example, a crypto engine, an encoder, or other module suitable for the intended purpose. The authentication module 120 may use a standard cryptographic algorithm to decrypt the fragment of encrypted code 114 using a key, which may be a cryptographic key. The standard cryptographic algorithm may be a symmetric encryption algorithm, such as Advanced Encryption Standard (AES), an asymmetric algorithm, or any other algorithm suitable for the intended purpose. The key may be initially hardcoded in fuses (not shown) or alternatively stored in a non-volatile memory (not shown). The key is then copied to the key buffer 122 during startup, prior to any system control, either by hardware or protected boot firmware. The key is personalized to the device 130 in the case of a symmetric algorithm, is known to the software developer only, and is not accessible to be read with software or any other means. While FIG. 1 shows the key buffer 122 and authentication module buffer 124 as separate buffers, they may be a single buffer.

The device 130 is configured to execute all of the code, both unencrypted and decrypted code. A difference between the executions of the unencrypted code and the decrypted code is from where the device 130 executes the code. Traditionally the device 130 would execute all code from the same system memory. But in apparatus 100, rather than storing decrypted code in internal system memories that are vulnerable to attacks, the fragments of encrypted code are copied from memory 110 into the authentication module 120, decrypted there, but also executed from there. The decrypted code is not copied back into memory 110 located outside the authentication module 120, but is instead stored in authentication module buffer 124.

The device 130 may be, for example, a central processing unit (CPU) or other device suitable for the intended purpose. In an alternative embodiment, the device 130 may comprise the memory 110 as an internal memory. This memory may be a Random Access Memory (RAM), Read Only Memory (ROM), flash memory or any other memory suitable for the device.

In an alternative embodiment, apparatus 100 comprises multiple devices 130. Each authentication module 120 has decrypted code that is executable by a respective one of the multiple devices 130, as indicated by a bus protocol. Also, the encrypted code 114 may comprise an identifier of the particular device 130 that is allowed access to the corresponding decrypted code stored in the buffer 124. The authentication module 120 determines whether a device access is authorized, and any device 130 attempting an unauthorized access will receive an error response.

An advantage of the apparatus 100 is that only a minor add-on modification of a standard crypto engine, that is, a modification of a bus interface, is required in order to implement the required functionality.

Figure 2:
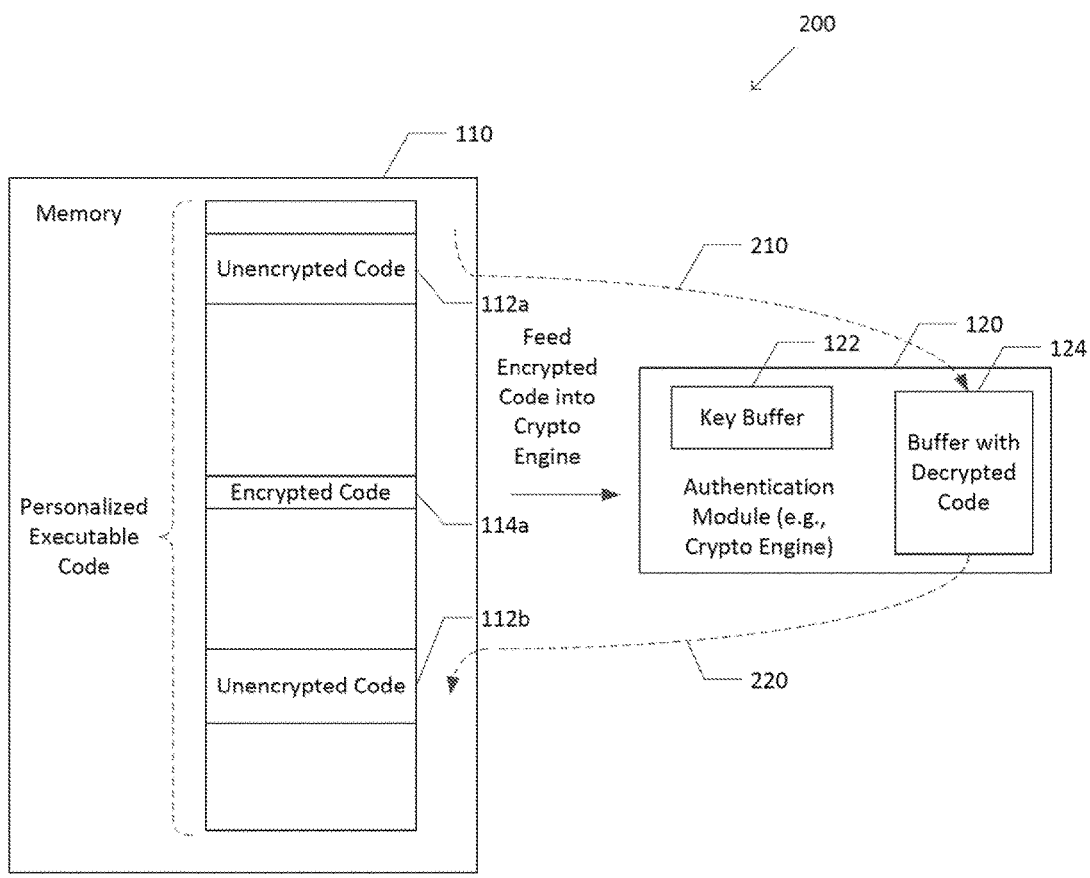
FIG. 2 is a schematic diagram illustrating an operation of an apparatus for preventing cloning of code.

FIG. 2 is a schematic diagram illustrating an operation of an apparatus 200 for preventing cloning of code. Like references numerals from FIG. 1 correspond to the same elements.

The code includes a plurality of fragments of encrypted code 114 distributed within the unencrypted code 112 as periodic "checkpoints" for preventing cloning. During execution, a fragment of encrypted code is fed from the memory 110 into the authentication module 120. In some embodiments the fragment of encrypted code may be loaded into the authentication module 120 automatically. The authentication module 120 is configured to decrypt the fragment of encrypted code 114 while the device 130 is executing the unencrypted code from the memory 110. This decryption is performed repeatedly, at the checkpoints.

The device 130 is configured to, subsequent to the decryption of the fragment of encrypted code 114, perform execution branching (e.g. jump or call) 210 from the memory 110 to the authentication module buffer 124 to execute the fragment of decrypted code from the authentication module buffer 124. The final instruction of the decrypted code causes the device 130 to return to the unencrypted code 112 in the memory 110 to a memory address in memory 110 that is valid for code execution, as shown at reference numeral 220. In some embodiments a return instruction may be inserted by the authentication module 120 automatically. Failure to successfully decrypt and execute of a "check point" code will lead to unpredictable behavior of the device 130 rendering the code unusable for unauthorized execution, that is, while running on an unauthorized device without corresponding key personalization.

The encrypted code 114 may, in some embodiments, include the address of the memory 110 at which the encrypted code is stored. By including this address, the same code stored at different memory locations will not result in the same encrypted code.

Further, the encrypted code 114 may, in some embodiments, include a checksum as an additional security measure to detect a modification of encrypted code. If the checksum is not valid, then a security action, such as a reset, may be performed. The reset could be designed to be executed after a predetermined period of time following a suspected attack, thereby making it more difficult for the attacker to determine what caused the reset. In addition, during the reset the critical code stored in the authentication module buffer 124 and/or the key stored in key buffer 122 are/is cleared.

Figure 3:
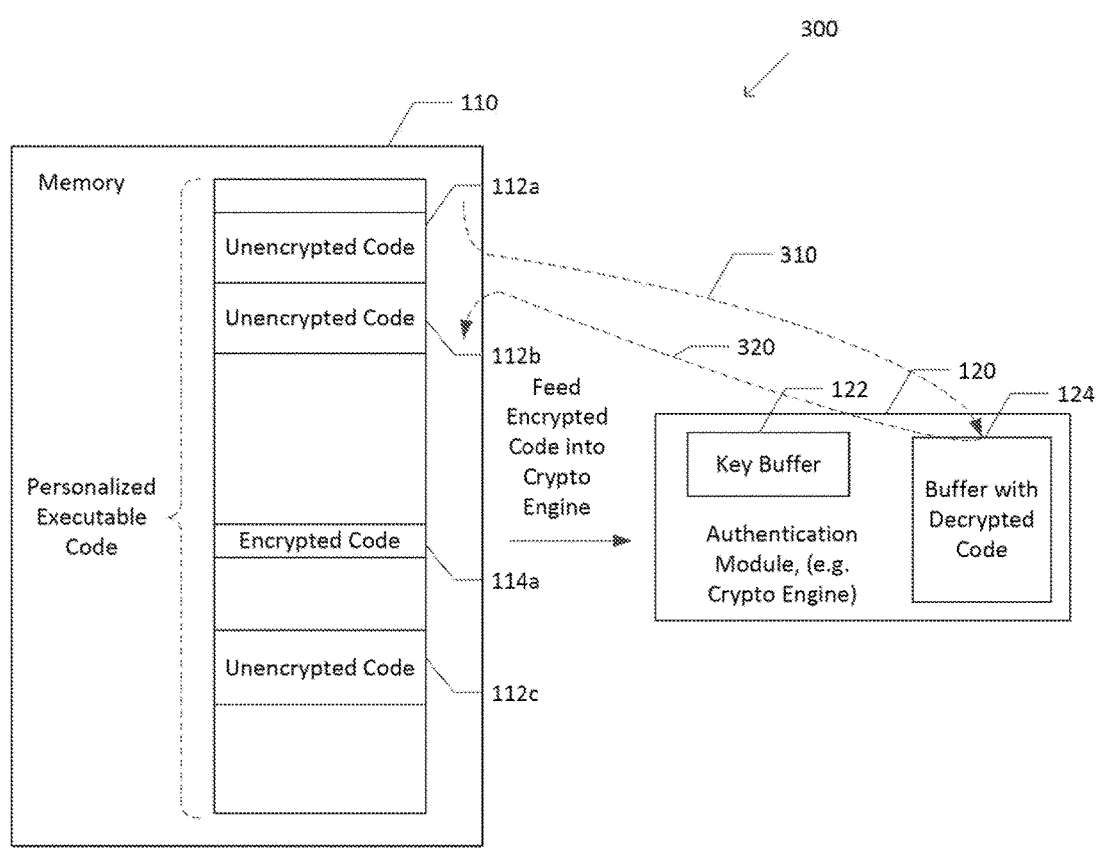
FIG. 3 is a schematic diagram illustrating an operation of an apparatus for preventing cloning of code.

FIG. 3 is a schematic diagram illustrating an operation of an apparatus 300 for preventing cloning of code. Like references numerals from FIGS. 1 and 2 correspond to the same elements. Apparatus 300 of FIG. 3 is essentially the same as apparatus 200 of FIG. 2 except that, rather than the device 130 returning to the memory 110 at a different position from where the device 110 performed execution branching (indicated at reference numeral 310), the device 130 returns to the memory 110 at the next instruction after the branch from where the device 130 performed execution branching, as indicated at reference numeral 320. In some embodiments additional obfuscation of the code may be included by executing a more sophisticated branching operation rather than merely a simple branch.

FIG. 4 is a flowchart illustrating a method for preventing cloning of code.

At Step 410, the authentication module 120 receives a fragment of encrypted code 114 from the memory 110.

The authentication module 120, at Step 420, decrypts the fragment of encrypted code 114 into a fragment of decrypted code. This decryption generally, but not necessarily, occurs while the device 130 is executing the unencrypted code from the memory 110. At Step 430 the authentication module 120 stores the fragment of decrypted code in the authentication module buffer 124.

At Step 440, the device 130 performs execution branching from the memory 110 to the authentication module buffer 124.

Next, at Step 450, the device 130 executes the fragment of decrypted code from the authentication module buffer 124. Again, the fragment of encrypted code is personalized to the device 110 and cannot be executed on an unauthorized device.

At Step 460, the device 130 returns to the memory 110 to continue to execute the unencrypted code from the memory 110. In one embodiment the device 130 returns to the memory 110 at a different position from where the device 130 performed execution branching, as shown at reference numeral 220 in FIG. 2. In an alternative embodiment, the device 130 returns to the memory 110 at a same position from where the device 130 performed execution branching, as shown at reference numeral 320 in FIG. 3.

In the case of a debug operation, the same operational timing as with unencrypted code must be obtained. To achieve this, a bypass mechanism in the authentication module 120 emulates temporal behavior by introducing latency identical to that required during the actual decryption. Alternatively, a specific published key, for example, all zeroes, could be used by the authentication module 120 as it would any other key, thereby avoiding the need for a special bypass mechanism. When not in a debug operation the anti-cloning protection feature is active so that there is no access to the authentication module buffer 124 from outside of the apparatus, no breakpoints, no trace, etc.

The anti-cloning solution offered by this disclosure is advantageous as compared with plain code in access protected memory, whether or not a significant portion of code is decrypted prior to executed and stored in this access protected memory. Plain (unencrypted) code is never stored in the internal system memories that are vulnerable to attacks. Plain code cannot be easily retrieved from the authentication module.

This anti-cloning solution disclosed herein is also advantageous as compared with on-the-fly full decryption. There is less power consumption, performance, and memory buffer required. Only a small portion of code is decrypted prior to execution as only the essential/confidential part of code needs to be encrypted.

Other advantages include fewer requirements on resources in that additional memory or an increase in load point is not required. There is scalable protection level and personalization effort. Also, there is still deterministic timing, so the apparatus and method disclosed herein are suitable for real-time applications.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. An apparatus for preventing cloning of code, the apparatus comprising:
   a memory configured to store the code, which includes unencrypted code and a fragment of encrypted code;
   an authentication module configured to receive and decrypt the fragment of encrypted code from the memory into a fragment of decrypted code, and to store the fragment of decrypted code in an authentication module buffer; and a device configured to execute the unencrypted code from the memory and to execute the fragment of decrypted code from the authentication module buffer, wherein the fragment of encrypted code is personalized to the device, wherein the authentication module is further configured to decrypt the fragment of encrypted code while the device is executing the unencrypted code from the memory, and wherein the device is further configured to, subsequent to the decryption of the fragment of encrypted code, perform execution branching from the memory to the authentication module buffer to execute the fragment of decrypted code from the authentication module buffer.

2. The apparatus of claim 1, wherein:
the code includes a plurality of fragments of encrypted code distributed within the unencrypted code and decryption is performed repeatedly as periodic checkpoints for preventing cloning.

3. The apparatus of claim 1, wherein the authentication module is further configured to execute a cryptographic algorithm to decrypt the fragment of encrypted code.

4. The apparatus of claim 1, wherein the authentication module buffer is further configured to prevent read access and allow executable code access.

5. The apparatus of claim 1, wherein the authentication module is one of a crypto engine and an encoder.

6. The apparatus of claim 1, wherein the encrypted code comprises the address of the memory at which the encrypted code is stored.

7. The apparatus of claim 1, wherein the encrypted code comprises a checksum.

8. An apparatus for preventing cloning of code, the apparatus comprising:
a memory configured to store the code, which includes unencrypted code and a fragment of encrypted code;

an authentication module configured to receive and decrypt the fragment of encrypted code from the memory into a fragment of decrypted code, and to store the fragment of decrypted code in an authentication module buffer; and a device configured to execute the unencrypted code from the memory and to execute the fragment of decrypted code from the authentication module buffer, wherein the fragment of encrypted code is personalized to the device, wherein the authentication module is further configured to store, during startup of the apparatus, a key that is personalized to the device, is not readable from the authentication module, and is for decrypting the fragment of encrypted code.

9. The apparatus of claim 8, wherein the key is personalized to a predefined group of devices.

10. The apparatus of claim 8, wherein the key is hard-coded in fuses or stored in a non-volatile memory and is not readable by software.

11. The apparatus of claim 8, where the device is a central processing unit.

12. A method for preventing cloning of code, the method comprising:
receiving, by an authentication module, a fragment of encrypted code from a memory storing the code, which includes unencrypted code and the fragment of encrypted code;

decrypting, by the authentication module, the fragment of encrypted code into a fragment of decrypted code;

storing the fragment of decrypted code in an authentication module buffer, executing, by the device, the unencrypted code from the memory and the fragment of decrypted code from the authentication module buffer, wherein the fragment of encrypted code is personalized to the device; and subsequent to the decryption of the fragment of encrypted code, performing execution branching from the memory to the authentication module buffer to execute the fragment of decrypted code from the authentication module buffer.

13. The method of claim 12, further comprising:
decrypting, by the authentication module, the fragment of encrypted code while the device is executing the unencrypted code from the memory.

14. The method of claim 12, further comprising:
subsequent to the execution of the fragment of decrypted code from the authentication module buffer, returning to the memory to continue to execute the unencrypted code from the memory.

15. The method of claim 14, wherein during a debug operation the decrypting step is performed using a published key.

16. The method of claim 14, further comprising:
returning to the memory at a different position from where the device performed execution branching.

* * * * *